United States Patent [19]
Strickler et al.

[11] Patent Number: 6,141,211
[45] Date of Patent: Oct. 31, 2000

[54] HEAT SINK CONDUCTION BETWEEN DISK DRIVE CARRIER AND INFORMATION STORAGE ENCLOSURE

[75] Inventors: Mike T. Strickler; Gregory H. Hite, both of Meridian, Id.

[73] Assignee: Hewlett-Packard Company, Palo Alto, Calif.

[21] Appl. No.: 09/107,095

[22] Filed: Jun. 29, 1998

[51] Int. Cl.$^7$ ...................................................... G06F 1/16
[52] U.S. Cl. ........................... 361/685; 361/687; 361/727
[58] Field of Search ..................................... 361/685, 687, 361/727

[56] References Cited

U.S. PATENT DOCUMENTS 5,828,546  10/1998  Tirrell et al. ............................. 361/685

OTHER PUBLICATIONS

Cheetah Family of Products; "10,000 RPM Drive Cooling and Power White Paper"; by Seagate (The Data Technology Company); pp.: 1, 7, 13, 15, 16.

*Primary Examiner*—Leo P. Picard
*Assistant Examiner*—Yean-Hsi Chang
*Attorney, Agent, or Firm*—Lane R. Simmons

[57] ABSTRACT

A mass storage system includes data storage modules having fins extending therefrom and further includes an enclosure having guides for slidably receiving the fins of the data storage modules into the enclosure and for enabling a coupled position of the data storage modules within the enclosure. A generally contacting fit is formed between the fins and guides for conducting heat from the data storage modules to the enclosure when the modules are disposed in the coupled position within the enclosure. In a preferred embodiment, the data storage modules include high performance disk drives disposed within carrier housings. The guides act as rail guides for slidably receiving the modules into the enclosure and for enabling electrical connection between the disk drives and the enclosure in the coupled position. The guides and firs are formed to maximize surface area contact therebetween when the drives are in the coupled position. In an alternate embodiment, the data storage modules are positionally biased within the enclosure when in the coupled position for improved surface area contact between the modules and the enclosure.

20 Claims, 3 Drawing Sheets

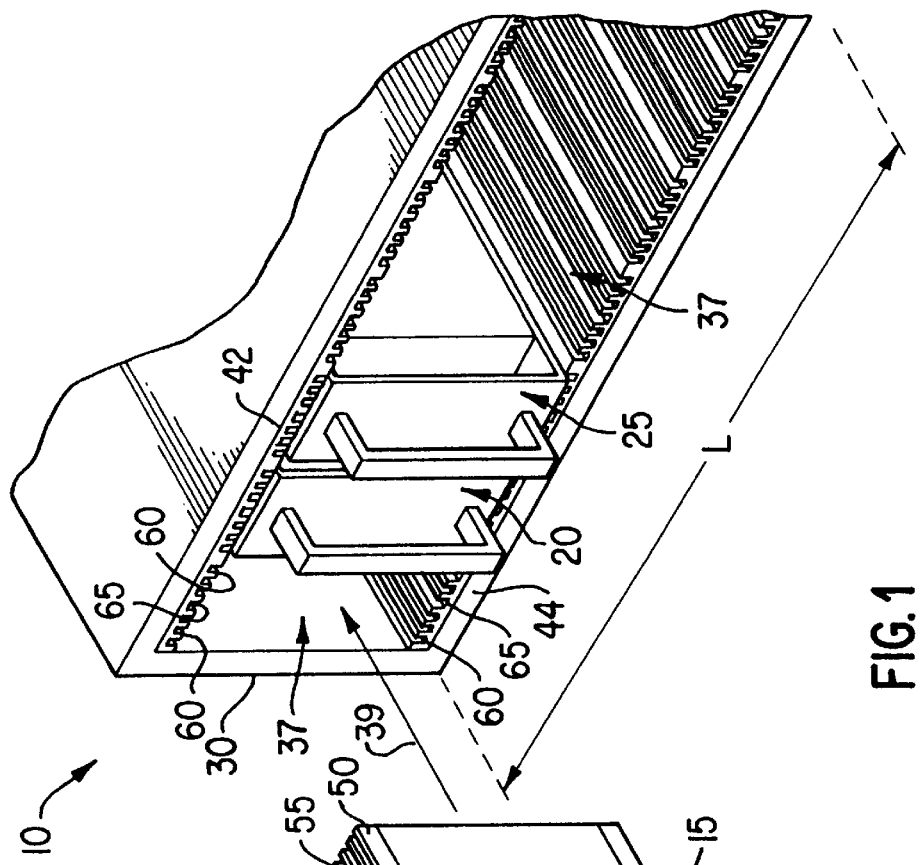
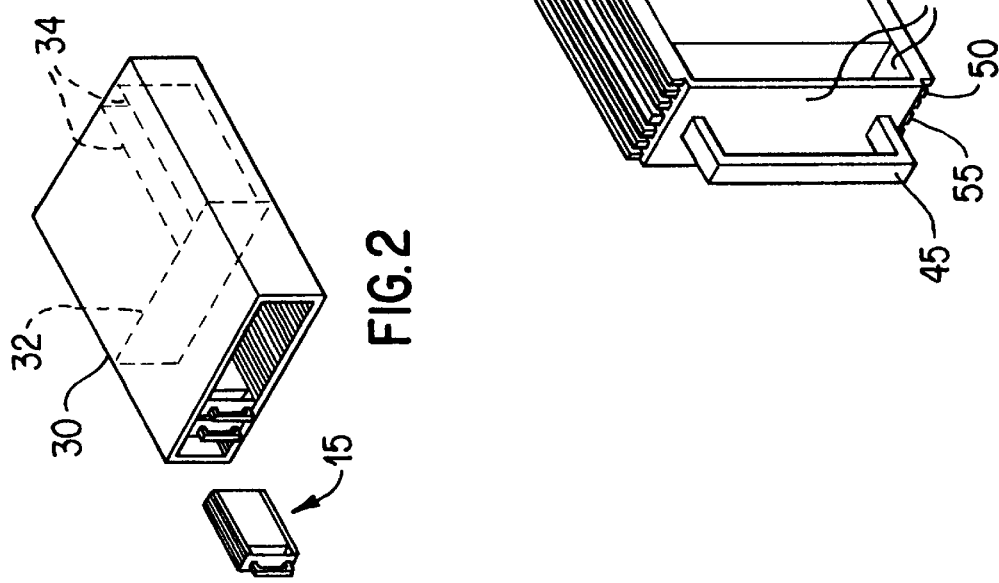
FIG. 1
FIG. 2

HEAT SINK CONDUCTION BETWEEN DISK DRIVE CARRIER AND INFORMATION STORAGE ENCLOSURE

FIELD OF THE INVENTION

This invention relates in general to disk drives and mass information storage enclosures and, more particularly, to apparatus and methods for thermal conduction therebetween.

BACKGROUND OF THE INVENTION

Existing mass storage systems often house multiple disk drive mechanisms in a single enclosure to implement modular disk array architectures and data redundancy schemes. For example, in one configuration known as "just a bunch of disks" (JBOD), multiple disk drives are housed in a common enclosure for enabling a mass storage configuration but no data redundancy or data migration techniques are employed across the drives. Another example is a redundant array of inexpensive disks (RAID) which typically includes, within a single information storage enclosure, multiple drives in shared communication with at least one common controller that enables data redundancy and/or data migration across the drives for variable capacity storage. The one or more controllers orchestrate the interconnection and control access to selected disk drivers for data reading and writing operations.

Regardless of the RAID or JBOD data management architecture employed, each disk drive is usually housed in connection with an individual module (carrier) for handling and installation relative to the common enclosure. The module generally includes some form of framework for supporting the drive (including a paired set of rail guides), a handle, and a latching mechanism for retaining the module in the common enclosure once inserted and electrically connected therein. The enclosure provides the sockets, plug-ins and other connections for the electrical interconnection of the drives. The modules are generally inserted into and removed from the common enclosure by means of conventional rail guides on the enclosure that interact with the rail framework supporting the drive.

Because of today's high-availability requirements for mass storage devices, and because of the often high rates of failure of conventional disk drives, these common storage enclosures are migrating towards hot-swap technology. In other words, the disk drives themselves are easily removable modules (i.e., each drive in its carrier), and any one or more of the modules (given the proper criteria) can be removed from the common enclosure while the enclosure and the other disk drives remain powered on and operating.

However, as technology continues to provide higher performance disk drives, the same tend to require more power and also run hotter. Thus, adequate cooling of the disk drives continues to be a real concern, especially in the multiple drive shared enclosure environment and in the context of hot-swap modular technology.

Accordingly, an object of the present invention is to provide improved cooling for high output modular disk drives that are housed in a common information storage enclosure.

SUMMARY OF THE INVENTION

According to principles of the present invention in a preferred embodiment, a mass storage system includes data storage modules having fins extending therefrom and further includes an enclosure having guides for slidably receiving the fins of the data storage modules into the enclosure and for enabling a coupled position of the data storage modules to the enclosure. A close, generally contacting fit is formed between the fins and guides for conducting heat from the data storage modules to the enclosure when the modules are disposed in the coupled position within the enclosure. In a preferred embodiment, the data storage modules include high performance disk drives disposed in association with carrier housings. The guides act as rail guides for slidably receiving the modules into the enclosure and for enabling thermal conduction between the module fins and the enclosure in the coupled position. The guides and fins are formed to maximize surface area contact therebetween when the modules are in the coupled position. In an alternate embodiment, the data storage modules are positionally biased within the enclosure when in the coupled position. In another embodiment, convection cooling is also enabled. Advantageously, this fin/guide configuration enables improved heat conduction and/or convection between the data storage modules and the common enclosure for improved cooling of the disk drives, and also serves as a rail guide system for enabling easy proper interconnection of the drives with the enclosure.

Other objectives, advantages, and capabilities of the present invention will become more apparent as the description proceeds.

DESCRIPTION OF THE DRAWINGS

FIG. 1 is a partial perspective view of the present invention information storage system embodying heat conduction as between data storage modules and a common enclosure.

FIG. 2 is a full perspective view of the storage system of FIG. 1.

DETAILED DESCRIPTION OF THE INVENTION

Figure 3:
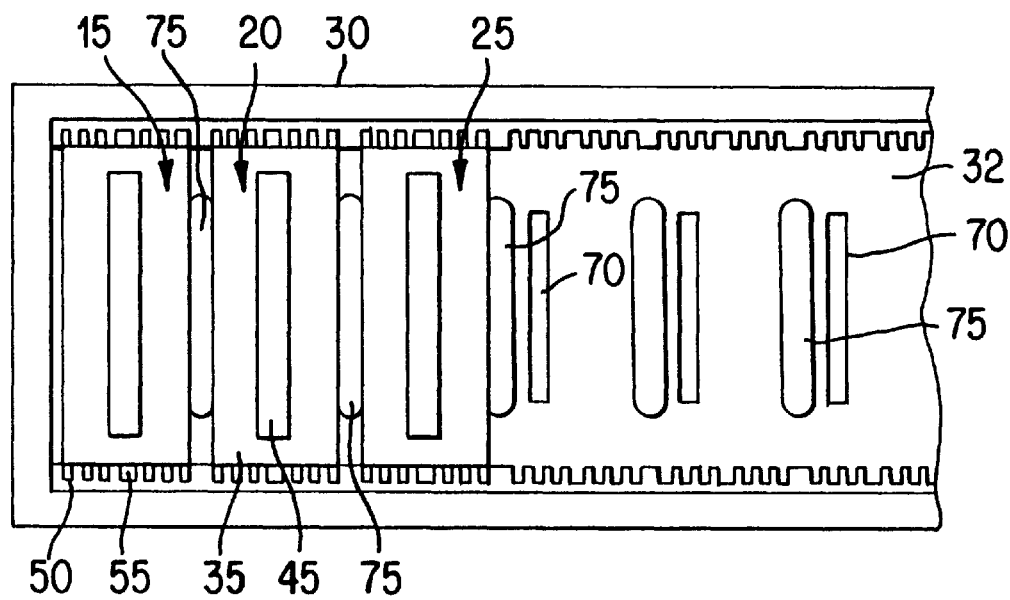
FIG. 3 is a partial front view of the storage system of FIG. 1.

FIG. 1 is a partial perspective view of the present invention information storage system 10 wherein heat conduction is enabled as between data storage modules 15, 20, 25 and a common enclosure 30. In a preferred embodiment, data storage modules 15, 20, 25 in connection with enclosure 30 form part of a JBOD system although the present invention is similarly applicable to a RAID system. Although only three data storage modules 15, 20 and 25 are shown, these are merely exemplary and others may also be used in connection with enclosure 30. Storage system 10 is a mass storage system that enables a variable capacity storage through use of the various data storage modules. In other words, for example, storage modules 15, 20 and 25 are interconnected disk drives that enable the desired capacity of mass storage. Modules 15, 20, 25 slide into and out of the enclosure 30 through opening 37 (which, in the shown example, extends the length "L" of the enclosure 30). Modules 20 and 25 are shown in FIG. 1 as being disposed within enclosure 30 and module 15 is shown as being ready for insertion into enclosure 30 as depicted by directional arrow 39.

Since enclosure 30 houses the array of modules 15, 20, 25, it provides the sockets, plug-ins, other connections and control means for the electrical interconnection and control of the modules for implementation of a JBOD architecture (in the depicted embodiment). Specifically, for example, and in reference to FIG. 2, enclosure 30 includes a mid-plane circuit board 32 for electrically connecting with modules 15, 20 and 25, and further includes one or more input/output (I/O) cards 34 for interconnection of the modules to a host computer (not shown). Mid-plane circuit board 32 and I/O cards (controllers) 34 are shown in phantom to depict their being disposed within enclosure 30.

Alternatively, in the event a RAID architecture is implemented with enclosure 30, cards 34 are controller cards that orchestrate the RAID interconnection of the modules and control access for data reading and writing operations. However, it should be noted that various configurations for cards 34 may be used beyond that depicted and described thus far. For example, in a RAID architecture, cards 34 may be I/O cards which also include the RAID controller means. Alternatively, cards 34 may simply be I/O cards, and additional controller cards (not shown) may be implemented to interconnect with the I/O cards (similar to modules 15, 20, 25) and thus be hot-swappable relative to enclosure 30.

Preferably, modules 15, 20, 25 are hot-swapable relative to enclosure 30 as managed by I/O cards (controllers) 34. Also in a preferred embodiment, enclosure 30 is formed of a thermally conductive material such as sheet metal.

Referring again now to FIG. 1, data storage modules 15, 20, 25 each comprise a carrier 35 and a disk drive 40. In a preferred embodiment, each carrier is formed of aluminum and includes a handle 45 for ease of manipulation (i.e., insertion into and removal from enclosure 30). Additionally, each carrier may include a latch (not shown) for locking carrier 35 into enclosure 30 when it is disposed therein. Although each disk drive 40 may be any conventional disk drive, the present invention is particularly applicable to high performance disk drives that require more power and run hotter than conventional models.

Each module 15, 20, 25 further includes fins 50, 55 extending therefrom. Fins 50,55 slidably mate with slots 60, 65 in enclosure 30. Slots 60, 65 are disposed in connection with (or are formed as part of) first and second side walls 42, 44 of enclosure 30. Fins 50, 55 and slots 60, 65 serve as an interlocking rail guide system for installation and positioning of the module into enclosure 30. In the shown embodiment, fins 55 are formed slightly wider than fins 50 to act as a key for alignment with a respective wider slot 65 in enclosure 30, thus enabling proper installation into enclosure 30 for connection with a connector on mid-plane circuit board 32. Importantly, fins 50, 55 and slots 60,65 are formed to provide a close, generally contacting fit therebetween and to provide a maximum surface area of contact when the module 15, 20, 25 is disposed in its connected position within enclosure 30. Gaps and irregularities between all mating surfaces are minimized as much as tolerances allow to minimize thermal resistance caused thereby. Thus, thermal conduction between the mating parts (i.e., between the fins 50,55 and slots 60,65) is maximized to provide enhanced cooling of disk drive 40 thereby lowering its temperature and increasing its life span and reliability. Advantageously, the present invention provides a simple and low cost solution for enabling both a rail guide structure and improved conductive cooling by effectively using the same parts (i.e., fins 50,55 and slots 60,65) for both purposes.

FIG. 3 is a partial front view of the information storage system 10 of FIGS. 1 and 2. Mid-plane connectors 70 are shown on circuit board 32. Corresponding connectors (not shown) on the back of the disk drives 40 of data storage modules 15, 20, 25 connect to connectors 70 for enabling data communications between the disk drives, mid-plane board 32 and controllers 34. Airflow apertures 75 are positioned on mid-plane board 32 such that they are in between the data storage modules when the modules are positioned within enclosure 30. Thus, airflow is allowed between the modules to further cool the disk drives. For example, fans (not shown) disposed behind mid-plane board 32 provide a means for drawing air through airflow apertures 75 and in between modules 15, 20 and 25 disposed within enclosure 30.

Figure 4:
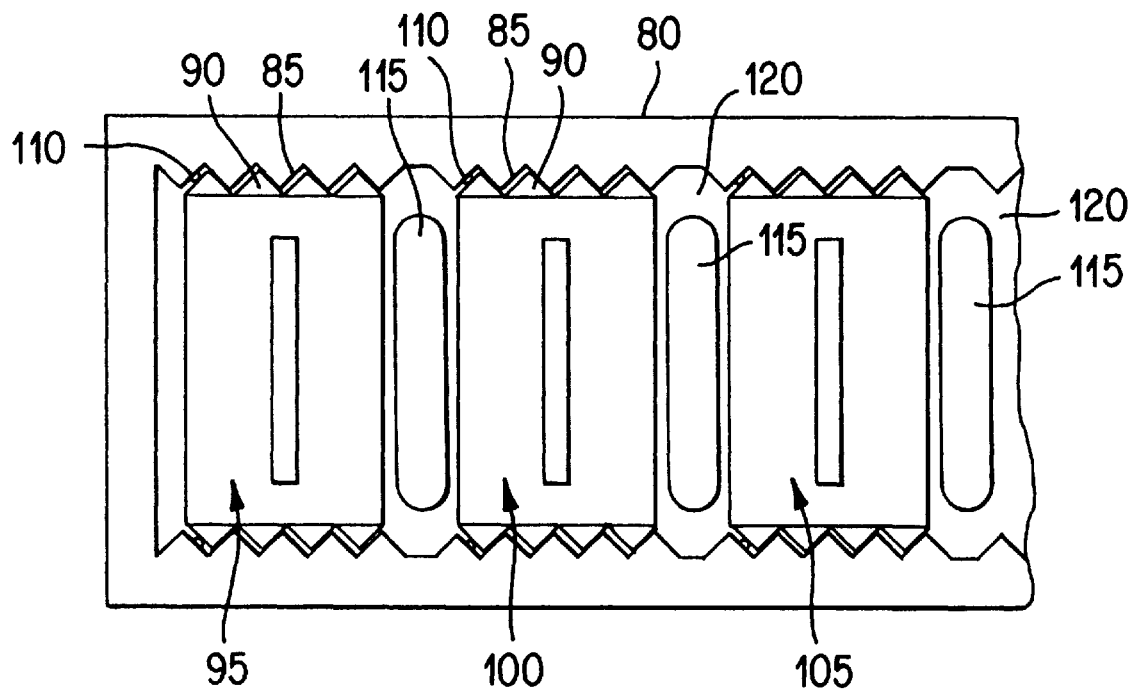
FIG. 4 is a partial front view of a first alternate embodiment.

FIG. 4 is a partial front view of a first alternate embodiment of the present invention. In this embodiment, enclosure 80 includes triangular shaped (tooth or sawtooth shaped) slots 85 for slidably mating with similarly shaped fins 90 that extend from data modules 95, 100 and 105. Also in this embodiment, guide bumps 110 bias the modules to one side for best thermal conduction surface area contact. Namely, as the modules 95, 100, 105 are guided (slid) into a mating position within enclosure 30, at the end of travel the guide bumps 110 position the module fins 90 more accurately against one side of slots 85. Guide bumps 110 are formed as part of enclosure 30 as a spring mechanism, for example, to bias the modules to one side. Alternatively, guide bumps 110 are components, such as formed from plastic, that are attached to enclosure 30 and that yield or are compliant to enable a biasing of the modules.

It should be noted that although guide bumps 110 are only shown and discussed relative to the embodiment of FIG. 4, they are clearly similarly applicable to other embodiments of the present invention. Additionally, apertures 115 disposed in mid-plane circuit board 120 enable airflow to pass between the modules 95, 100, 105 for further convection cooling in addition to the conduction cooling provided by the mated slots (guides) 85 and fins 90.

Advantageously, one benefit of the embodiment of FIG. 4 is that increased surface area contact is obtained for enhanced thermal conduction while allowing manufacturing tolerances to be opened up. Specifically, the exactness of the close contacting fit between all surfaces of guides 85 and fins 90 is not so crucial as compared to that of guides 60 and fins 50 of FIG. 1. The enabled variability in manufacturing tolerances for the guides/fins of FIG. 4 is specifically compensated for by guide bumps 110.

Figure 5:
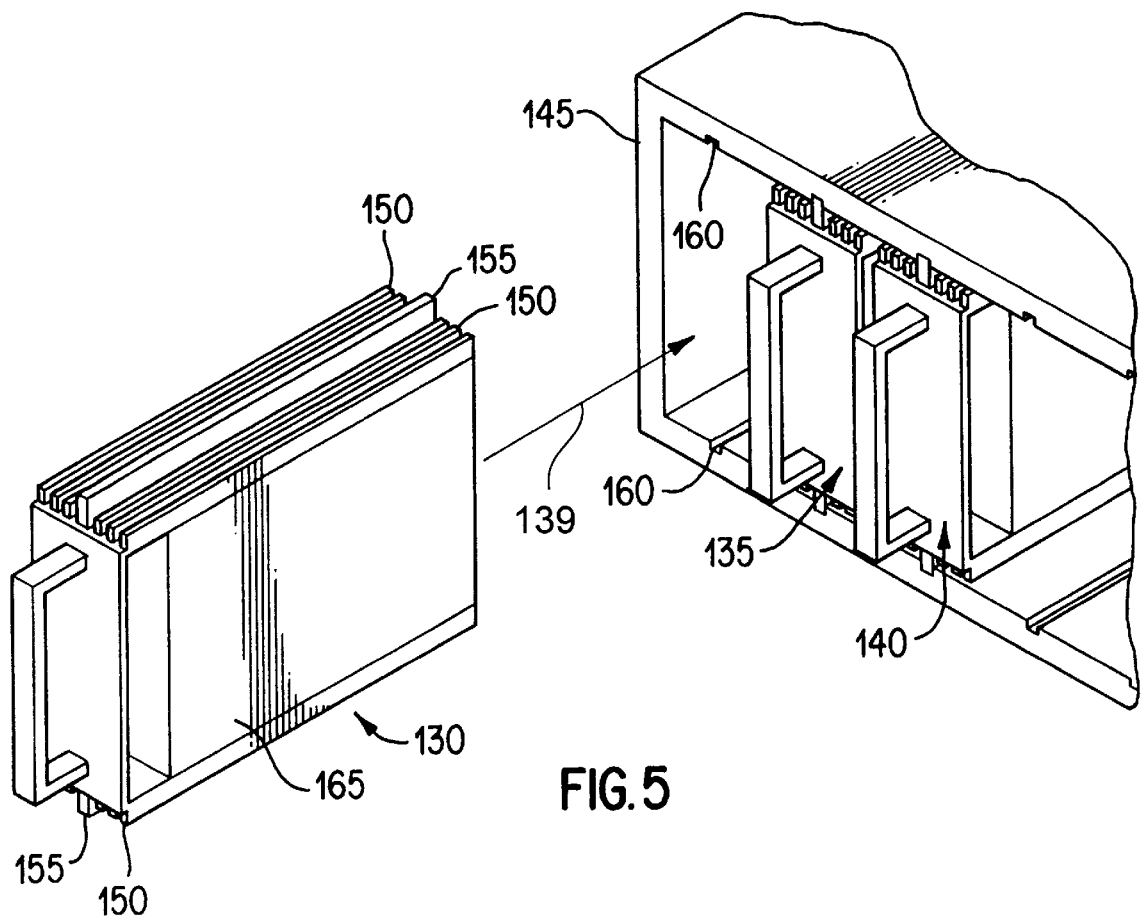
FIG. 5 is a partial perspective view of a second alternate embodiment of the preset invention embodying heat convection in addition to conduction as between data storage modules and a common enclosure.

Referring now to FIG. 5, a partial perspective view of a second alternate embodiment of the present invention is shown embodying mostly heat convection for cooling purposes but also some conduction as between data storage modules 130, 135, 140 and a common enclosure 145. Modules 135 and 140 are shown in FIG. 5 as being disposed within enclosure 145, and module 130 is shown as being ready for insertion into enclosure 145 as depicted by directional arrow 139. Similar to the embodiment of FIG. 1, each module 130, 135, 140 includes fins (extensions) 150 Extending therefrom. However, shorter fins 150 do not slidably mate with any slots in enclosure 145 but dissipate heat from the module (i.e., from disk drive 165) by means of convection as air is passed over and around the fins. Only longer fins 155 slidably mate with slots 160 in enclosure 145 for serving as an interlocking rail guide system and key for installing and positioning the module into the enclosure and for conducting heat therebetween when the module is disposed within the enclosure. Thus, this embodiment employs primarily convection but also conduction for improved cooling of disk drives 165 (modules 130, 135, 140).

Figure 6:
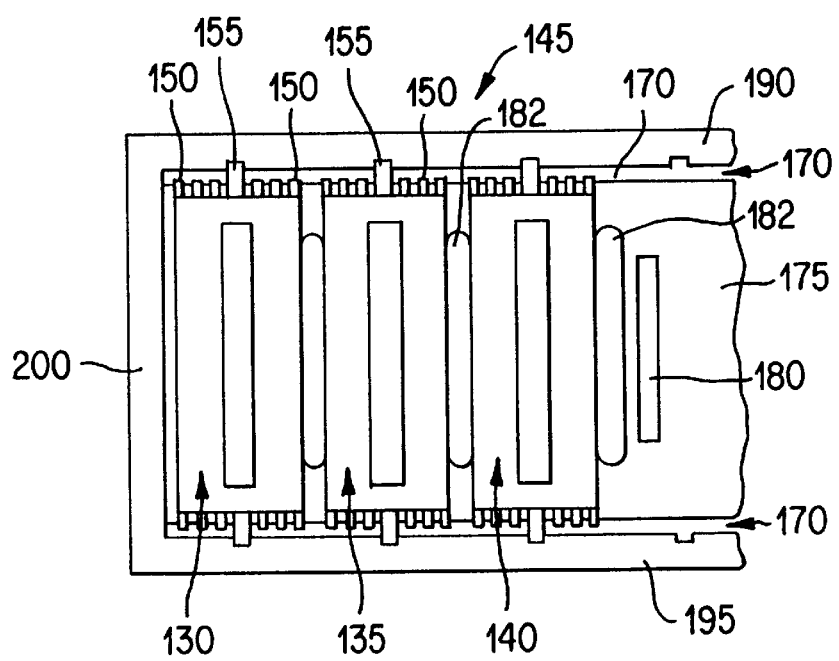
FIG. 6 is a partial front view of the second alternate embodiment of FIG. 5.

Referring now to FIG. 6, a partial front view of FIG. 5 is depicted. FIG. 6 clearly depicts how fins 150 do not contact enclosure 145. Rather, an air gap 170 exists between fins 150 and enclosure 145. Additionally, air gap 170 exists between mid-plane circuit board 175 and enclosure 145. Mid-plane circuit board 175 includes connectors 180 for interconnecting with modules 130, 135, 140, and includes apertures 182 therein for enabling air flow between the modules. To enable air gap 170, mid-plane circuit board 175 does not extend all the way to each side wall 190, 195 of enclosure 145 but is supported at side wall 200 and at various intermittent points (not shown) along side walls 190, 195. In any case, airflow is enabled along and in between fins 150, 155 and through air gap 170, and in between modules 130, 135, 140 and through apertures 182 for convection cooling purposes. Additionally, fins 155 provide some conduction cooling as they mate with slots 160.

Finally, what has been described above are the preferred embodiments of an information storage system wherein a fin/slot configuration enables heat conduction and/or convection and also serves as a rail guide system as between data storage modules and a common enclosure. While the present invention has been described by reference to specific embodiments, it will be apparent that other alternative embodiments and methods of implementation or modification may be employed without departing from the true spirit and scope of the invention.

What is claimed is:

1. A storage system, comprising:
   (a) an enclosure having receiving means therein; and,
   (b) at least one carrier having at least three extensions protruding therefrom that are configured to slidably mate with the receiving means for: (i) guiding the carrier into a coupled position within the enclosure, and (ii) conducting heat from the carrier to the enclosure in the coupled position.

2. The storage system of claim 1 further including an electronic device or an electromechanical device disposed within the carrier.

3. The storage system of claim 1 further including a mass storage device such as a disk drive disposed within the carrier.

4. The storage system of claim 1 wherein the receiving means includes cavities, slots, grooves, or tooth formations therein, and the extensions are formed to slidably mate, respectively, with the cavities, slots, grooves, or tooth formations.

5. The storage system of claim 1 wherein the enclosure is formed to allow air flow therethrough in a substantially parallel path with the extensions as they are disposed in a slidably mated position with the receiving means.

6. The storage system of claim 1 wherein the receiving means and the extensions are formed to maximize surface area contact therebetween when in the coupled position.

7. The storage system of claim 1 further including a bias component configured to bias the carrier within the enclosure when in the coupled position for improved surface area contact between the carrier and the enclosure.

8. The storage system of claim 1 wherein the carrier further includes extensions protruding therefrom that do not contact the receiving means in the coupled position.

9. The storage system of claim 8 wherein the extensions that do not contact the receiving means enable a convection transfer of heat from the carrier.

10. A mass storage system comprising:
    (a) at least one data storage module having at least three fins extending therefrom; and,
    (b) an enclosure having guides for slidably receiving the at least three fins of the at least one data storage module into the enclosure and for enabling a coupled position of the data storage module within the enclosure, and whereby a generally contacting fit is formed between the fins and guides in the coupled position for conducting heat from the data storage module to the enclosure.

11. The mass storage system of claim 10 wherein the guides act as rail guides for slidably receiving the data storage module into the enclosure for enabling electrical connection to the enclosure in the coupled position.

12. The mass storage system of claim 10 further including at least one controller electrically connected to the at least one data storage module when the data storage module is in the coupled position, and wherein the at least one controller orchestrates the interconnection and access to the at least one data storage module for data reading and writing operations.

13. The mass storage system of claim 10 wherein the enclosure is formed to allow air flow therethrough in a substantially parallel path with the fins as they are disposed in the generally contacting fit with the guides.

14. The mass storage system of claim 10 wherein the guides and the fins are formed to maximize surface area contact therebetween when in the generally contacting fit.

15. The mass storage system of claim 10 wherein the data storage module further includes fins extending therefrom that do not contact the guides when the data storage module is disposed within the enclosure.

16. The mass storage system of claim 10 further including a bias component configured to bias the data storage module in the coupled position within the enclosure for improved surface area contact between the data storage module and the enclosure.

17. A data storage module comprising a housing having at least three extensions configured to slidably guide the data storage module into a generally contacting fit with a module enclosure, the generally contacting fit enabling a heat conduction path from the data storage module extensions to the enclosure.

18. The data storage module of claim 17 wherein the housing further includes fins extending therefrom that do not contact the module enclosure when the data storage module is disposed in the generally contacting fit within the module enclosure.

19. An enclosure for data storage modules, comprising:
    (a) opposing side walls and an open end; and
    (b) at least three slots along each sidewall, the slots configured to receive at least three fins extending from at least one of the data storage modules through the open end of the enclosure and into a generally contacting fit with the slots, the generally contacting fit of the at least three fins enabling a heat conduction path from the at least one of the data storage modules to the enclosure.

20. The enclosure for data storage modules of claim 19 wherein the data storage modules further include fins extending therefrom that do not contact the opposing side walls when the data storage module is disposed within the enclosure in the generally contacting fit.

* * * * *